E. BAKER.
HARVESTING MACHINE.
APPLICATION FILED DEC. 12, 1918.
1,346,159.
Patented July 13, 1920.
2 SHEETS—SHEET 1.
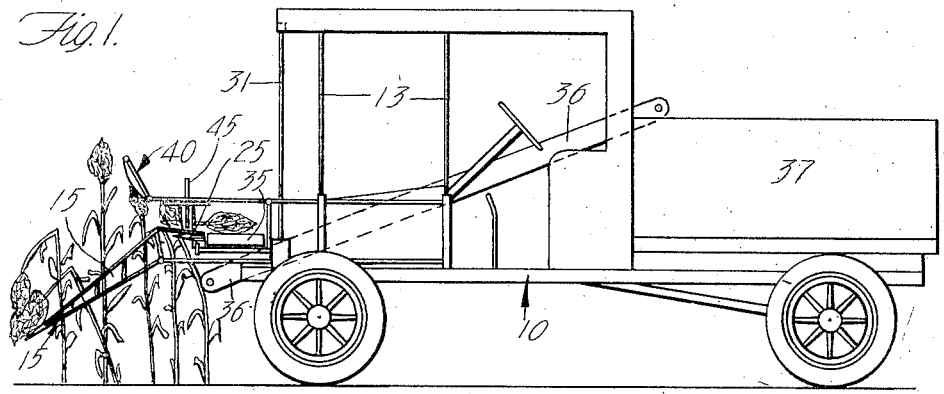
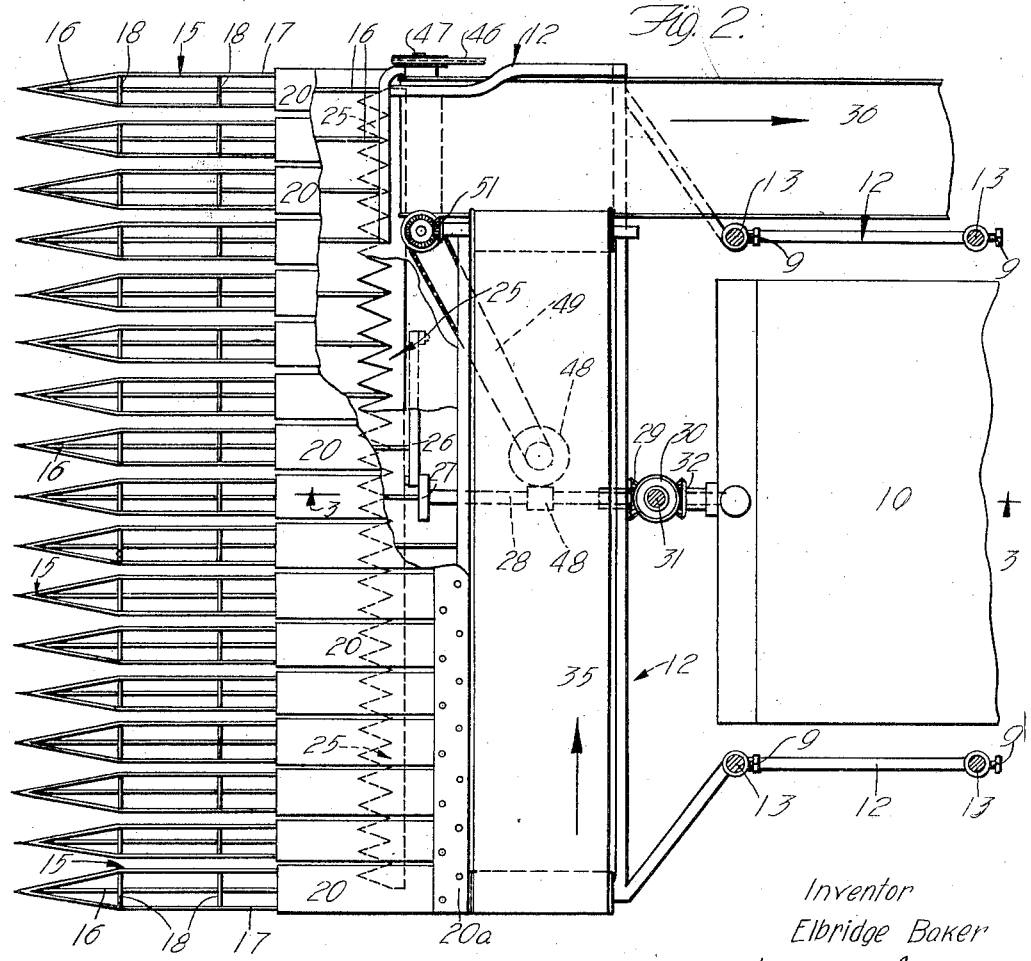
Inventor
Elbridge Baker
his Attorney.

E. BAKER.
HARVESTING MACHINE.
APPLICATION FILED DEC. 12, 1918.
1,346,159.
Patented July 13, 1920.
2 SHEETS—SHEET 2.
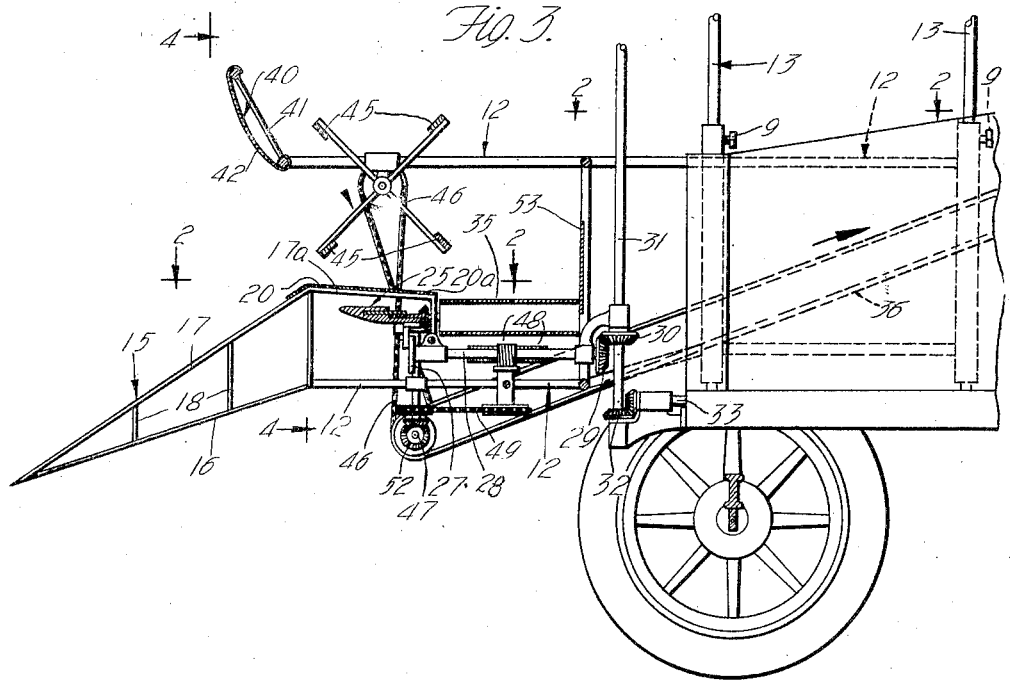
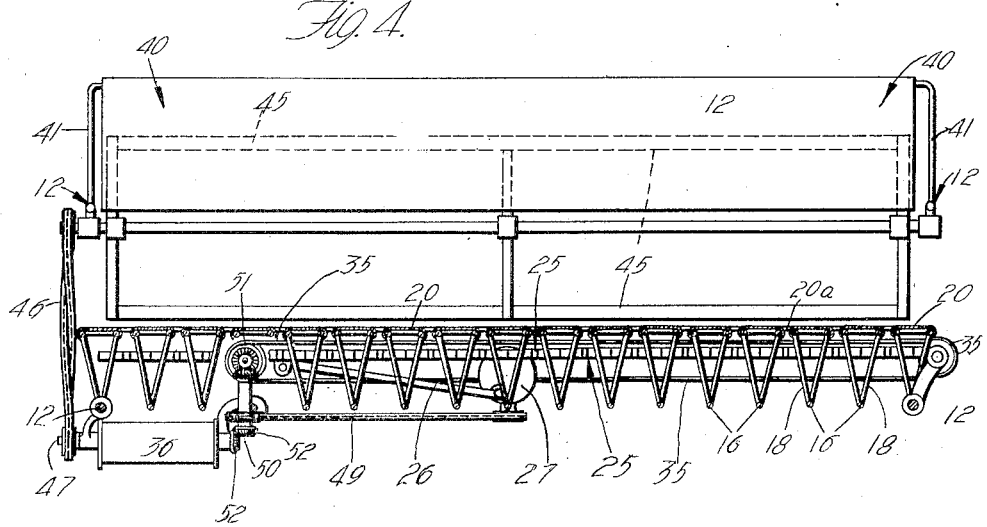
Inventor
Elbridge Baker
his Attorney.

UNITED STATES PATENT OFFICE.

ELBRIDGE BAKER, OF LOS ANGELES, CALIFORNIA, ASSIGNOR OF ONE-FOURTH TO E. P. TUCKER, ONE-FOURTH TO GEORGE W. TACKABURY, AND ONE-FOURTH TO G. D. ROBERTSON, ALL OF LOS ANGELES, CALIFORNIA.

HARVESTING-MACHINE.

1,346,159.  Specification of Letters Patent.  Patented July 13, 1920.

Application filed December 12, 1918. Serial No. 266,423.

*To all whom it may concern:*

Be it known that I, ELBRIDGE BAKER, a citizen of the United States, residing at Los Angeles, in the county of Los Angeles, State of California, have invented new and useful Improvements in Harvesting-Machines, of which the following is a specification.

This invention relates to harvesting machines adapted more particularly for harvesting cereals and the like which grow at the top of stalks, or for any other vegetable growth of a similar habit; and the invention relates more particularly to the harvesting of such cereals as milo-maize, Kaffircorn and the like, which grows with heavy heads and which is usually harvested by cutting the heads from the stalk. The heads of this grain are so heavy as to sometimes bend or break the stalk and lower the heads considerably below those heads which stand on unbroken stalks; and it is a peculiarity of such cereals that some stalks grow considerably higher than others; and it is a desideratum to cut the heads of the grain from the stalks at a short uniform distance below the heads. It is one of the more specific objects of this invention to provide a harvesting machine which will accomplish such uniform cutting. In order to do so, I provide means to raise the low, bent or broken stalks and heads to a uniform height in front of the cutter; and means to lower the high heads to that same uniform height.

There are further objects of the invention, such as simplicity, lightness, cheapness, and ease of operation; and these and other specific objects, and the manner in which the invention accomplishes them, will be made apparent in the following detailed description of a preferred form of harvesting mechanism; reference being had for this purpose to the accompanying drawings in which—

Figure 1 is a side elevation of my improved harvesting machine mounted upon an automobile truck or the like; Fig. 2 is an enlarged plan section of the machine itself taken on line 2—2 of Fig. 3; Fig. 3 is a central vertical section of the machine taken as indicated by line 3—3 on Fig. 2; Fig. 4 is a vertical section and front elevation taken as indicated by line 4—4 on Fig. 3.

In the drawings I show at 10 an automobile truck which may be utilized as the carrier and the source of power for my machine; although any other vehicle and source of power may be used. I may mount my machine in any position relatively to the carrying vehicle; but in this particular instance I show the machine mounted ahead of the vehicle so that the vehicle pushes the machine into the grain. The machine itself is mounted upon a suitable frame 12 which I preferably construct of pipe, for sake of lightness; and this frame is preferably mounted upon vertical posts 13, and is vertically adjustable thereon, so that the machine as a whole may be adjusted in height to suit the height of the plant growth. Posts 13 may be mounted upon the automobile truck in any suitable manner, and set screws 9 may serve to set and hold the frame 12 at any desired height. However it will be understood that this vertical adjustment may be dispensed with and the machine simplified by making a non-adjustable mounting at a height to suit the grain operated upon. The frame 12 carries at its forward end a plurality of guide fingers 15 which are of the general configuration shown in the drawings. Preferably these guide fingers each comprise a central lower member 16 and two upper laterally spaced members 17 above the member 16; and these members are preferably made of wire or rod and are braced by transverse brace members 18, as is illustrated. At the forward end there is a converging pointed construction to facilitate entry between stalks. Each finger is in the nature of a light skeleton frame work which is amply stiff and rigid for the purposes described. These fingers 15 are spaced apart with open spaces between them wide enough to pass the stalks; and, in a general way, they extend downwardly and forwardly, as illustrated; the angle being dependent upon varying circumstances. However, the upper members 17, in the rearward part of their extent, as shown at 17ª, extend substantially horizontally, or somewhat downwardly and rearwardly to cause rearward movement of the severed heads; and in this part of their extent the members 17 of each finger 15 are covered by a sheet metal or other apron 20 as is shown in Figs. 2, 3 and 4. The purpose of this apron is to prevent the heads from dropping down between the members 17 when the heads are raised by the forward motion of the fingers. At their rear parts, back of the position at which cutting takes place, the fingers are joined together by a transverse bar of strip 20ª. The space between finger 15 is not large enough to pass the heads; and as the machine progresses through a field, the fingers enter between stalks and the stalks pass through the spaces between fingers. Any broken or bent over heads are raised by this action and the heads move up the inclined fingers, as will be apparent from an inspection of the drawings. The fingers not only raise the low heads, but they also hold the stalks against transverse movement during the cutting action. Immediately below the parts 17ª I place a cutting mechanism 25 which may preferably be, although not necessarily, similar to an ordinary mowing machine cutter. This cutter may be reciprocated by a connecting rod 26 from a crank disk 27 mounted on shaft 28. Shaft 28 is driven by gears 29 and 30 from a vertical shaft 31 on which gear 30 is keyed and is slidable. Shaft 31 is driven by gears 32 from shaft 33 of the automobile.

The stalks are cut by cutting mechanism 25 and the heads pass rearwardly, or are moved rearwardly, onto cross conveyer 35. Cross conveyer 35 carries the heads of grain over to a longitudinal conveyer 36, which conveys the heads to a bin 37 on the automobile. Those heads which are severed from stalks which are between the fingers at the left hand side in Fig. 4, may fall directly onto longitudinal conveyer 36 without first being carried by conveyer 35.

In order to bring the higher heads down to the uniform height required I employ a guard 40 which extends across the front end of the machine above the fingers 15. This guard 40 may be made with a suitable pipe frame 41 and a sheet metal covering 42, or it may be of any suitable construction or material. The high heads or stalks (those which are higher than the low average) strike against this guard and are thereby caused to move down and bend forward in order to pass under the guard, the stalks being bent forward and downward by the guard until the heads are low enough to pass underneath before coming in contact with the cutter. The high heads are thus brought down to the height of the low average or lowest stalks (for which the machine is set) and to the same height that the bent or broken heads are lifted to and all the heads are thus at a uniform height and in a uniform position relative to the cutter when they pass over the cutter position.

When the heads are cut, instead of merely being allowed to fall onto conveyers 35 and 36, they may be positively moved onto those conveyers. This may be done by any suitable mechanism, such as a paddle wheel 45 which revolves in a direction indicated by the arrow in Fig. 3 and is rotated by a chain drive 46 from shaft 47 of the longitudinal conveyer 36. Both the conveyers may be operated from shaft 28 through the medium of a worm drive at 48, and a chain 49 which drives to a vertical shaft 50. From this vertical shaft gears 51 and 52 drive the conveyers 35 and 36, respectively. Back of conveyer 35 may be a board 53 to prevent the heads falling off the rear edge.

When my harvesting machine is used in a field, it can be first set at the proper height to properly catch the low upright heads. The low bent or broken stalks with their heads are drawn up to proper height by the fingers 15 and the high heads are pushed forward and down to the proper height by the low guard 40. Consequently, all the stalks are cut at a substantially uniform distance below the head; and the severed heads are then carried rearwardly and put into the machine proper.

Having described a preferred form of my invention, I claim:

1. In a harvesting machine, the combination of a horizontal cutter and carriage means for carrying it against stalks, means for raising low heads of grain comprising a plurality of downwardly and forwardly extending fingers in front of and below the cutter, said fingers being substantially parallel and spaced apart to pass stalks of cereals and not to pass the heads, said fingers extending over the cutter at their rear ends so as to carry the heads above the cutter; and conveyer means behind the cutter.

2. In a harvesting machine, the combination of a horizontal cutter and carriage means for carrying it against stalks, means for raising low heads of grain comprising a plurality of downwardly extending fingers in front of and below the cutter, said fingers being substantially parallel and spaced apart to pass stalks of cereals and not to pass the heads, said fingers extending over the cutter at their rear ends so as to carry the heads above the cutter, guard means above the fingers and above the cutter, for pressing forwardly upon high heads; and conveyer means behind the cutter.

3. In a harvesting machine, the combination of a horizontal cutter and carriage means for carrying it against stalks, means for raising low heads of grain comprising a plurality of downwardly and forwardly extending fingers in front of and below the cutter, said fingers being substantially parallel and spaced apart to pass stalks of cereals and not to pass the heads, said fingers extending over the cutter at their rear ends so as to carry the heads above the cutter; conveyer means behind the cutter; and means for positively moving the heads rearwardly past the cutter and onto the conveying means.

4. In a harvesting machine, the combination of a horizontal cutter and carriage means for carrying it against stalks, means for raising low heads of grain comprising a plurality of downwardly and forwardly extending fingers in front of and below the cutters, said fingers being substantially parallel and spaced apart to pass stalks of cereals and not to pass the heads, said fingers extending over the cutter at their rear ends so as to carry the heads above the cutter; guard means above the fingers and above the cutter for pressing forwardly upon high heads; conveyer means behind the cutter; and means for positively moving the heads rearwardly past the cutter and onto the conveying means.

5. In a harvesting machine, the combination of a stalk cutter, and means to move heads of cereals and the like to a uniform height in a position before the cutter, said means embodying a plurality of spaced parallel fingers extending downwardly and forwardly in front of the cutter, each finger tapered to a forward point, and the spaces between fingers being sufficient to pass the stalks but not the heads of the grain being harvested.

6. In a harvesting machine, the combination of a stalk cutter, and means to move heads of cereals and the like to a uniform height in a position before the cutter, said means embodying a plurality of spaced parallel fingers extending downwardly and forwardly in front of the cutter, each finger tapered to a forward point, and the spaces between fingers being sufficient to pass the stalks but not the heads of the grain being harvested, said fingers extending over the cutter at their rear parts so as to carry the heads above the cutter and cause the stalks to be engaged by the cutter; and conveyer means behind the cutter and adapted to take the severed heads.

7. In a harvesting machine, the combination of a stalk cutter, and means to move heads of cereals and the like to a uniform height in a position before the cutter, said means embodying a plurality of spaced parallel fingers extending downwardly and forwardly in front of the cutter, each finger tapered to a forward point, said fingers extending over the cutter at their rear parts so as to carry the heads above the cutter and cause the stalks to be engaged by the cutter; conveyer means behind the cutter and adapted to take the severed heads; and means ahead of and above the cutter and above the fingers adapted to strike high heads and stalks and cause them to bend forward and lower down to bring such heads down onto the fingers.

8. In a harvesting machine of the character described, the combination of a cutter adapted to cut stalks and carriage means for moving the cutter against stalks, means carried ahead of the cutter and extending below it for raising low heads of grain, and an upwardly and forwardly extending guard above the cutter and forward of it for lowering high heads of grain.

In witness that I claim the foregoing I have hereunto subscribed my name this 3d day of December, 1918.

ELBRIDGE BAKER.

Witness:
VIRGINIA BERINGER.